United States Patent
Liao

(10) Patent No.: US 10,310,776 B2
(45) Date of Patent: *Jun. 4, 2019

(54) OUTPUT METHOD AND OUTPUT DEVICE FOR CLOUD PRINTING

(71) Applicant: AVISION INC., Hsinchu (TW)

(72) Inventor: Chun-Chieh Liao, Hsinchu (TW)

(73) Assignee: AVISION INC., Hsinchu (TW)

(*) Notice: Subject to any disclaimer, the term of this patent is extended or adjusted under 35 U.S.C. 154(b) by 0 days.

This patent is subject to a terminal disclaimer.

(21) Appl. No.: 16/013,836

(22) Filed: Jun. 20, 2018

(65) Prior Publication Data

US 2018/0314470 A1 Nov. 1, 2018

Related U.S. Application Data

(63) Continuation-in-part of application No. 15/674,684, filed on Aug. 11, 2017, now Pat. No. 10,051,138.

(30) Foreign Application Priority Data

Feb. 10, 2017 (TW) .............................. 106104462 A

(51) Int. Cl.
  *G06F 3/12* (2006.01)
  *H04N 1/00* (2006.01)
  (Continued)

(52) U.S. Cl.
  CPC .......... *G06F 3/1204* (2013.01); *G06F 3/1222* (2013.01); *G06F 3/1238* (2013.01); *G06F 3/1256* (2013.01); *G06F 3/1267* (2013.01); *G06F 3/1274* (2013.01); *G06F 3/1288* (2013.01); *G06F 21/608* (2013.01); *H04N 1/0023* (2013.01); *H04N 1/00344* (2013.01); *H04N 1/00408* (2013.01);
  (Continued)

(58) Field of Classification Search
  None
  See application file for complete search history.

(56) References Cited

U.S. PATENT DOCUMENTS 6,802,004 B1* 10/2004 Gross ...................... G06F 21/10
                                              713/161
8,610,935 B1* 12/2013 McKinley ............. G06F 3/1204
                                              358/1.15
(Continued)

*Primary Examiner* — Miya J Williams
(74) *Attorney, Agent, or Firm* — Maschoff Brennan

(57) ABSTRACT

An output method and an output device include steps below. A first electronic device sends a file to a server and generates a piece of verification information corresponding to the file. A second electronic device receives the piece of verification information. An output device reads the piece of verification information, and obtains the file from the server according to the piece of verification information. The output device receives a first verification code via a user interface, determines whether the first verification code matches the piece of verification information, and outputs the paper document of the file when the first verification code matches the piece of verification information. The output device sends a second verification code, generated according to encode data of the file, to the second electronic device for a further verification and deletes the file after the output device output the paper document of the file.

13 Claims, 4 Drawing Sheets

(51) Int. Cl.
*H04N 1/32* (2006.01)
*G06F 21/60* (2013.01)

(52) U.S. Cl.
CPC .................. *H04N 1/32122* (2013.01); *H04N 2201/0039* (2013.01); *H04N 2201/0081* (2013.01); *H04N 2201/0082* (2013.01); *H04N 2201/3216* (2013.01); *H04N 2201/3235* (2013.01)

(56) References Cited

U.S. PATENT DOCUMENTS

| | | | |
|---|---|---|---|
| 10,051,138 B1* | 8/2018 | Liao | H04N 1/0023 |
| 2003/0030657 A1* | 2/2003 | Kenji | G06F 21/608 |
| | | | 715/700 |
| 2003/0030840 A1* | 2/2003 | Parry | G06K 15/00 |
| | | | 358/1.15 |
| 2005/0199699 A1* | 9/2005 | Sato | G06F 17/30879 |
| | | | 235/375 |
| 2006/0195506 A1* | 8/2006 | Deng | H04L 51/066 |
| | | | 709/203 |
| 2009/0103124 A1* | 4/2009 | Kimura | G06F 3/1204 |
| | | | 358/1.15 |
| 2010/0002251 A1* | 1/2010 | Tachibana | G06F 3/0488 |
| | | | 358/1.15 |
| 2010/0250951 A1* | 9/2010 | Ueno | H04L 9/0844 |
| | | | 713/176 |
| 2012/0091202 A1* | 4/2012 | Cohen | G06F 21/33 |
| | | | 235/382 |
| 2013/0083351 A1* | 4/2013 | Barber | G06F 3/1205 |
| | | | 358/1.15 |
| 2013/0194623 A1* | 8/2013 | Tecu | G06F 3/1204 |
| | | | 358/1.15 |
| 2017/0257516 A1* | 9/2017 | Panda | H04N 1/32133 |

* cited by examiner

US 10,310,776 B2

OUTPUT METHOD AND OUTPUT DEVICE FOR CLOUD PRINTING

CROSS-REFERENCE TO RELATED APPLICATIONS

This non-provisional application claims priority under 35 U.S.C. § 120 on patent application Ser. No. 15/674,684 filed in U.S. on Aug. 11, 2017 which claims priority under 35 U.S.C. § 119(a) on Patent Application No(s). 106104462 filed in Taiwan, R.O.C. on Feb. 10, 2017, the entire contents of which are hereby incorporated by reference.

TECHNICAL FIELD

The disclosure is related to an output method and an output device for cloud printing, and particularly to an output method and an output device for cloud printing using the verification information.

BACKGROUND

In the conventional method using the printer or the business machine, if a user wants to print the document in a computer, he/she needs to upload the file of the document to the printer or the business machine and go to the printer or the business machine to get the printed document.

However, the arrangement or the procedure of a task may be related to persons on different floors, in different areas, or different countries nowadays. In certain condition, one user may provide the original file for another user at a remote terminal for printing that file with an output device. If the output device at the remote terminal is operated by many people, there may be information outflow or document confused which lead to an unpredictable loss.

For privacy or security, most printing operations are performed when the user needs a paper document so that there is no privacy problem or the data outflow problem.

Then, it is a problem to be solved how to balance between the file security and the convenience of user operation.

SUMMARY

In one embodiment of the present disclosure, the output method for cloud printing includes the following steps. A first electronic device sends a file to a server and generates a piece of verification information corresponding to the file. A second electronic device displays the piece of verification information. An output device reads the piece of verification information displayed by the second electronic device and obtains the file from the server according to the piece of verification information so as to output a paper document of the file. The output device receives a first verification code via a user interface and determines whether the first verification code matches the piece of verification information. The output device outputs the paper document of the file when the first verification code matches the piece of verification information. The output device deletes the file after the output device output the paper document of the file. After the step of the output device receiving the first verification code via the user interface and determining whether the first verification code matches the piece of verification information further includes sending a second verification code to the second electronic device to perform further verification, and the second verification code is generated according to encode data of the file.

In one embodiment, the output device for cloud printing has a verification circuit, a communication circuit, an output circuit and a user interface. The communication circuit is coupled to the verification circuit, and the output circuit is coupled to the communication circuit. The verification circuit is configured for reading a piece of verification information displayed by a second electronic device. The communication circuit is configured for obtaining a file from a server according to the piece of verification information. The output circuit is configured for outputting a paper document of the file. The user interface module is coupled to the verification circuit and the output circuit, and configured for providing a user interface to receive a first verification code, and configured for determining whether the first verification code matches the piece verification information, and configured for controlling the output circuit to output the paper document of the file when the first verification code matches the piece of verification information. Wherein, the output device receives the first verification code from the user interface and sends a second verification code to the second electronic device for further verification after determining whether the first verification code matches the piece of verification information, and the second verification code is generated according to encode data of the file.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

The present disclosure will become more fully understood from the detailed description given hereinbelow and the accompanying drawings which are given by way of illustration only and thus are not limitative of the present disclosure and wherein.

DETAILED DESCRIPTION

Figure 1:
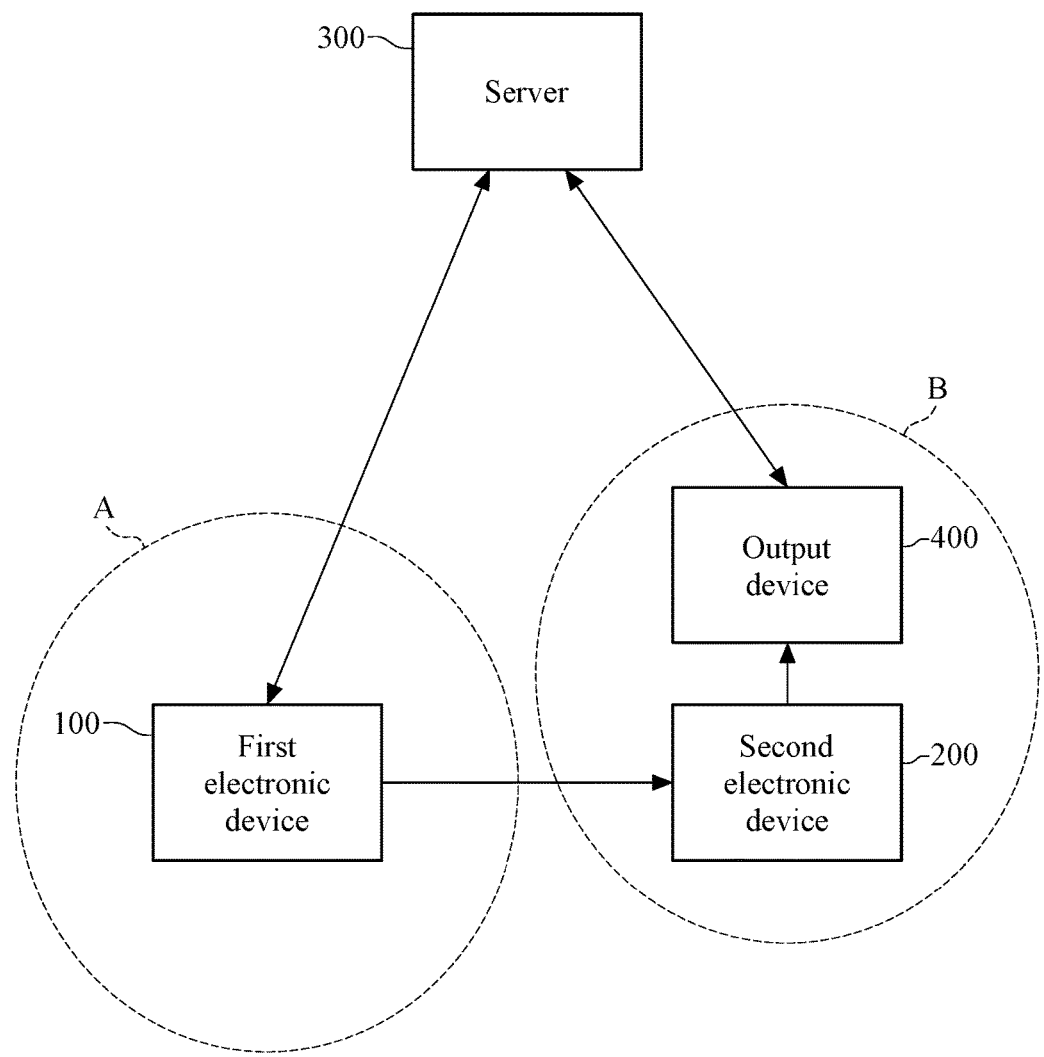
FIG. 1 is a schematic of an output system 10 according to one embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic of an output system 10 according to one embodiment of the present disclosure. As shown in FIG. 1, the output system 10 has a first electronic device 100, a second electronic device 200, a server 300, and an output device 400. In practice, the first electronic device 100 is, for example, a personal computer or other device with network functionality. The second electronic device 200 is, for example, portable electronic device such as a smart phone, a tablet computer, and a personal digital assistant, or other device with networking functionality. The server 300 is, for example, a cloud server or other type of server. The output device 400 is, for example, a printer, a business machine, or other device adequate for document outputting. There is a variety of the aforementioned device and should not be limited to the aforementioned embodiment.

Figure 2:
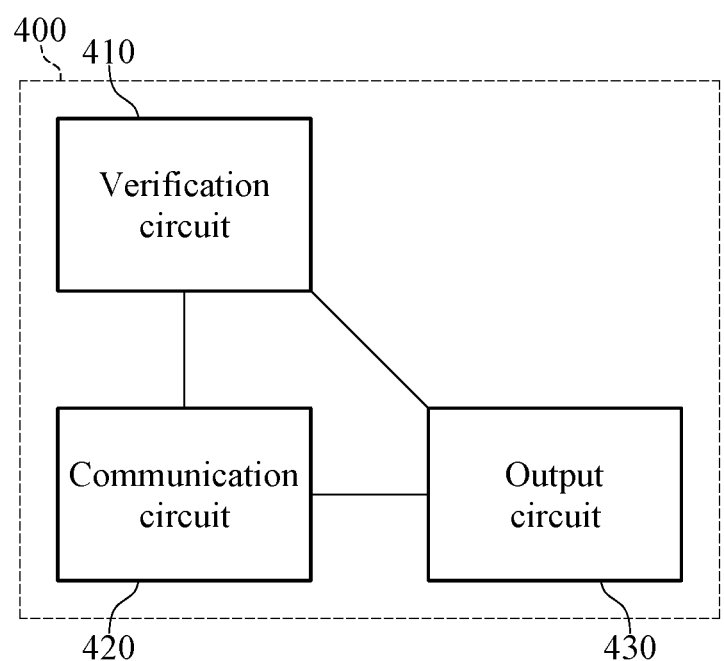
FIG. 2 is a block diagram of an output device 400 according to one embodiment of the present disclosure.

FIG. 2 is a block diagram of an output device 400 according to one embodiment of the present disclosure. As shown in FIG. 2, the output device 400 has a verification circuit 410, a communication circuit 420 and an output circuit 430. The communication circuit 420 is coupled to the verification circuit 410, and the output circuit 430 is coupled to the verification circuit 410 and the communication circuit 420. The verification circuit 410, the communication circuit 420 and the output circuit 430 may be implemented by one or more processors or integrated circuits and have further functional elements therein. The disclosure does not intend to limit the aforementioned circuits by the embodiment.

A using environment is illustrated in the following embodiment for better understanding. For example, when the user B at the second place wants to obtain a file document possessed by the user A at the first place, and the user B cannot get an electronic original version of the file, and the file document may be obtained by the user B via printing means, the task may be accomplished by the architecture of the output system 10. Here, the first electronic device 100 is possessed by the user A at the first place, and the second electronic device 200 is possessed by the user B at the second place, and the output device 400 is also located at the second place.

Please refer to FIG. 1 and FIG. 2. The first electronic device 100 sends a file to a server 300, and generates a piece of verification information corresponding to the file. For example, the server 300 may serve for a plurality of output devices including the output device 400, and the range of the service of the server 300 may include the first place and the second place. When the user A at the first place uploads a certain file to the server 300 and generates a corresponding piece of verification information, the user A may send the piece of verification information to the user B at the second place via a variety of communication medium such as a communication application program, an e-mail, or other communication ways. In another embodiment, however, the user A may send the piece of verification information generated by the first electronic device 100 to the server 300, and then the server 300 transfers the piece of verification information to the second electronic device 200 of the user B. The disclosure does not intend to limit the scope to the aforementioned embodiment.

The second electronic device 200 receives the piece of verification information and then outputs the piece of verification information. For example, the piece of verification information may be a certificate for the user B to print the aforementioned file document at the second place. In other words, the second electronic device 200 outputs the piece of verification information so that the output device 400 may verify whether the user B has the rights (to print the file document). In one embodiment, the second electronic device 200 outputs the piece of verification information by displaying certain identification code such as a quick response code (QR code) on its screen. For example, the user B receives the QR code corresponding to the piece of verification information sent by the user A via communication software. In addition, the second electronic device 200 may output the piece of verification information via wireless communication technique such as radio frequency identification (RFID), near field communication (NFC), etc.

The operations of the output device 400 are illustrated below:

The verification circuit 410 reads the piece of verification information outputted by the second electronic device 200. In one embodiment, the verification circuit 410 reads the piece of verification information by image capturing, scanning or wireless communicating.

For example, the verification circuit 410 may be a QR code scanner configured for obtaining the piece of verification information in the QR code displayed by the second electronic device 200. The verification circuit 410 may be, in another example, a data receiver utilizing the wireless communication technique such as RFID or NFC.

In one embodiment of the present disclosure, the verification circuit 410 may further decode the piece of verification information so as to obtain a network address of the server 300. Thereby, the communication circuit 420 obtains a file from the server 300 according to the piece of verification information. Explicitly, the communication circuit 420 may communicate with the server 300 according to the network address decoded from the piece of verification information, and download the file uploaded by the user A from the server 300.

The output circuit 430 is configured for outputting a paper document of the file. In one embodiment of the present disclosure, the verification circuit 410 may further decode the piece of verification information so as to obtain at least one among a format corresponding the paper document and an output configuration corresponding to the paper document. In other words, the format and the output configuration of the paper document printed by the output circuit may be preset by the user A and the corresponding setting may be encrypted in the piece of verification information. The format is, for example, the number of the paper document, how many pages should be integrated into one page, etc. The output configuration is, for example, the selected content to be outputted with in the file, the size of the paper for outputting, etc. Therefore, the user B may use the output device 400 according to the received piece of verification information to obtain the corresponding file from the cloud and print the corresponding paper document.

In another embodiment of the present disclosure, the output device may be integrated with the server. In other words, the server itself has the functionality of outputting the paper document. For example, the user A may send the file to the server at the second place via the first electronic device, and the user B at the second place may show the received piece of verification information so as to control the server to print the corresponding paper document.

Figure 3:
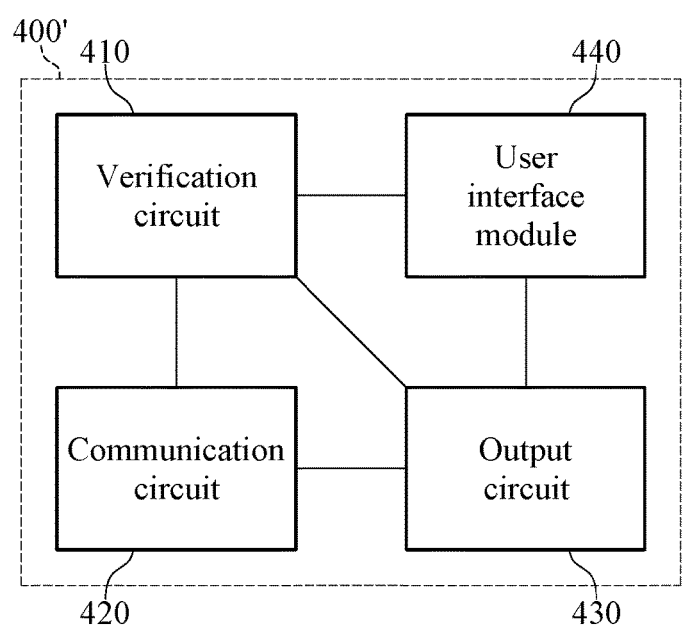
FIG. 3 is a block diagram of the output device 400' according to another embodiment of the present disclosure.

FIG. 3 is a block diagram of the output device 400' according to another embodiment of the present disclosure. As shown in FIG. 3, the output device 400' has a verification circuit 410, a communication circuit 420, an output circuit 430, and a user interface module 440. The communication circuit 420 is coupled to the verification circuit 410, and the output circuit 430 is coupled to the verification circuit 410 and the communication circuit 420, and the user interface module 440 is coupled to the verification circuit 410 and the output circuit 430. The verification circuit 410, the communication circuit 420, the output circuit 430 and the user interface module 440 are, for example, implemented by micro processors or integrated circuits and having corresponding functional elements therein. The verification circuit 410, the communication circuit 420, and the output circuit 430 in FIG. 3 may have similar function as illustrated in FIG. 2. Please refer to FIG. 1 and FIG. 3 together for illustrating the difference between the embodiment in FIG. 2 and the embodiment in FIG. 3.

In one embodiment of the present disclosure, the user interface module 440 is capable of providing a user interface for receiving a verification code and determining whether the verification code matches the piece of verification information. When the verification code matches the piece of verification information, the user interface module 440 controls the output circuit 430 to output the paper document of the file. For example, the user interface may be displayed in a touch display screen. In addition, the user B may receive the QR code corresponding to the piece of verification information from the user A via the communication software or receive a verification code from the user A via telephone.

In other words, there are two verification procedures in the output of the paper document of the file. The first verification procedure is illustrated in the embodiment in FIG. 2. After the verification circuit 410 reads the piece of verification information sent by the second electronic device 200, the second verification procedure may be initiated. The verification circuit 410 may decode the piece of verification information in advance so as to obtain a preset verification code. After the user B inputs the verification code in the user interface, the user interface module 440 is capable of determining whether the verification code matches the preset verification code. When the input verification code matches the preset verification code, the user interface module 440 controls the output circuit 430 to output the paper document of the file.

In another embodiment of the present disclosure, after the output device 400 receives the verification code and determines whether the verification code matches the piece of verification information, the output device 400 sends a verification code to the second electronic device 200 for verification again. In one embodiment, the verification code may be generated according to encode data of the file in the server 300 and a first public-key. The second electronic device 200 has a first private-key corresponding to the first public-key. The second electronic device 200 further obtains encode data of the file from the first electronic device 100. With the information, the second electronic device 200 is capable of verifying whether the file to be outputted by the output device 400 is the file which the user wants to output. Hence, it is prevented that the file in the server 300 has been amended by others while the user does not know. The type of the encode data mentioned above can be various and determined by the user according to specific demands. In one embodiment, the encode data includes a MD5 hash value, a Huffman code or a JPEG code.

In an example, the encode data may include a set of information of date and time, such as a MD5 hash value. In practice, since the Huffman code or the JPEG code involves the content of the file without the information of time and date, it is difficult to identify the version of the file correctly. Specifically, comparing other encode data such as the Huffman code or the JPEG code, the advantage of the MD5 hash value is that the MD5 hash value not only involves contents of the file, but also involves information of date and time related to the file. In an example, when a file is modified by others without amending the content of the file, the device is not capable of discovering that the file has been modified based on the Huffman code or the JPEG code. In contrast, the device is capable of discovering that the file has been modified by the others based on the MD5 hash value because the MD5 hash value includes the information of date and time which would be necessarily amended when the file is modified by the others.

In other words, based on the MD5 hash value involving both the contents of the file and the information of time and date related to the file, the second electronic device 200 is capable of raising the accuracy of the verification.

In addition, in one embodiment of the present disclosure, after the output device 400 outputs the paper document of the file, the output device 400 may delete the file obtained from the server 300. Hence, the original electronic version of the paper document may be prevented from outflow and the information security may be improved.

Figure 4:
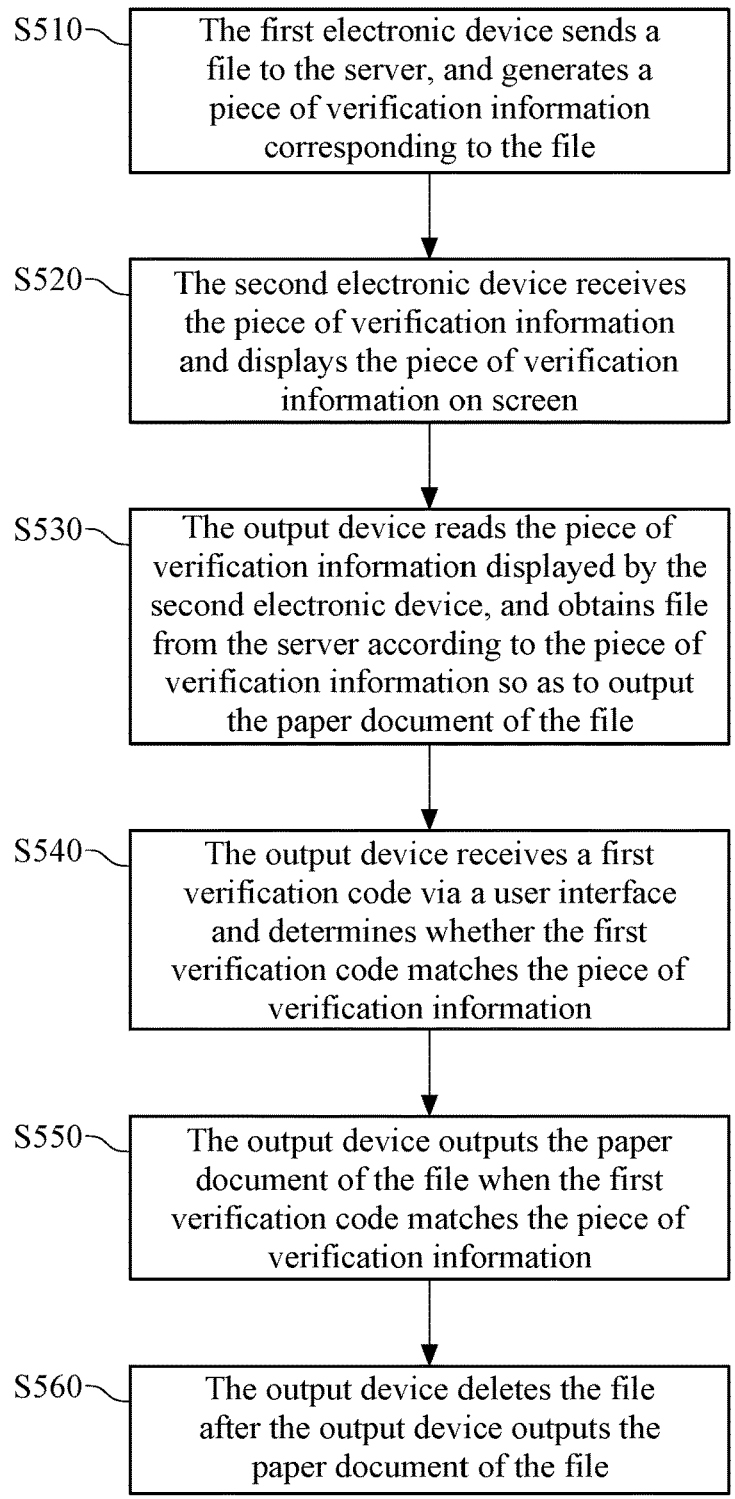
FIG. 4 is a flowchart of the output method according to one embodiment of the present disclosure.

FIG. 4 is a flowchart of the output method according to one embodiment of the present disclosure. As shown in FIG. 4, the output method in one embodiment of the present disclosure includes steps S510 to steps S560.

In step S510, the first electronic device sends a file to the server, and generates a piece of verification information corresponding to the file.

In step S520, the second electronic device receives the piece of verification information and displays the piece of verification information on screen.

In step S530, the output device reads the piece of verification information displayed by the second electronic device, and obtains file from the server according to the piece of verification information so as to output the paper document of the file.

In step S540, the output device receives a first verification code via a user interface and determines whether the first verification code matches the piece of verification information.

In step S550, the output device outputs the paper document of the file when the first verification code matches the piece of verification information.

In step S560, the output device deletes the file after the output device outputs the paper document of the file.

In this embodiment, after the step of the output device receiving the first verification code via the user interface and determining whether the first verification code matches the piece of verification information further includes sending a second verification code to the second electronic device to perform further verification, and the second verification code is generated according to encode data of the file.

The details of the aforementioned steps are illustrated in the above embodiments and would not be illustrated again here.

As above, the second electronic device may take the piece of verification information generated by the first electronic device as a certificate for the output device. When the verification circuit of the output device verifies the piece of verification information, the communication circuit of the output device may obtain the file from the server according to the piece of verification information sent from the second electronic device, and the output circuit of the output device outputs the corresponding paper document. Hence, the hardware resources in different areas are integrated and the operation of the output device is simplified, and the security of the information transmission is improved.

What is claimed is:
1. An output method for cloud printing, comprising:
a first electronic device sending a file to a server and generating a piece of verification information corresponding to the file;
a second electronic device displaying the piece of verification information on a screen thereof;
an output device reading the piece of verification information displayed by the second electronic device, and obtaining the file according to the piece of verification information so as to output a paper document of the file, the output device receiving a first verification code via a user interface and determining whether the first verification code matches the piece of verification information;

outputting the paper document of the file when the first verification code matches the piece of verification information; and deleting the file after the output device outputs the paper document of the file;

wherein after the step of the output device receiving the first verification code via the user interface and determining whether the first verification code matches the piece of verification information further comprising: sending a second verification code to the second electronic device to perform further verification, and the second verification code is generated according to encode data of the file.

2. The output method according to claim 1, wherein the encode data comprises a set of information of date and time.

3. The output method according to claim 1, wherein the encode data comprises one of a MD5 hash value, a Huffman code and a JPEG code.

4. The output method according to claim 1, wherein the step of the output device reading the piece of verification information displayed by the second electronic device, and obtaining the file according to the piece of verification information so as to output the paper document of the file comprises:

the output device reading the piece of verification information by image capturing, scanning or wireless communicating.

5. The output method according to claim 4, wherein the step of the output device reading the piece of verification information displayed by the second electronic device, and obtaining the file according to the piece of verification information so as to output the paper document of the file further comprises:

the output device decoding the piece of verification information so as to obtain a network address of the server.

6. The output method according to claim 5, wherein the step of the output device reading the piece of verification information displayed by the second electronic device, and obtaining the file according to the piece of verification information so as to output the paper document of the file further comprises:

the output device decoding the piece of verification information so as to obtain at least one among a format corresponding to the paper document and an output configuration of the paper document.

7. An output device for cloud printing, comprising:

a verification circuit configured for reading a piece of verification information displayed by a second electronic device;

a communication circuit coupled to the verification circuit and configured for obtaining a file from a server according to the piece of verification information;

an output circuit coupled to the communication circuit and the verification circuit and configured for outputting a paper document of the file; and a user interface module coupled to the verification circuit and the output circuit, and configured for providing a user interface to receive a first verification code, and configured for determining whether the first verification code matches the piece verification information, and configured for controlling the output circuit to output the paper document of the file when the first verification code matches the piece of verification information;

wherein the output device receives the first verification code from the user interface and sends a second verification code to the second electronic device for further verification after determining whether the first verification code matches the piece of verification information, and the second verification code is generated according to encode data of the file.

8. The output device according to claim 7, wherein the encode data comprises a set of information of date and time.

9. The output device according to claim 7, wherein the encode data comprises one of a MD5 hash value, a Huffman code and a JPEG code.

10. The output device according to claim 7, wherein the verification circuit reads the piece of verification information by image capturing, scanning or wireless communicating.

11. The output device according to claim 10, wherein the verification circuit further decodes the piece of verification information so as to obtain a network address of the server.

12. The output device according to claim 11, wherein the verification circuit further decodes the piece of verification information so as to obtain at least one among a format corresponding to the paper document and an output configuration of the paper document.

13. The output device according to claim 7, wherein the output device deletes the file after the output device outputs the paper document of the file.

* * * * *